(12) United States Patent
Byrnes

(10) Patent No.: US 8,694,592 B2
(45) Date of Patent: Apr. 8, 2014

(54) E-MAIL ADDRESSES IN COLOR

(75) Inventor: Barbara Joan Byrnes, Baltimore, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 320 days.

(21) Appl. No.: 12/912,208

(22) Filed: Oct. 26, 2010

(65) Prior Publication Data

US 2012/0102122 A1 Apr. 26, 2012

(51) Int. Cl.
*G06F 15/16* (2006.01)

(52) U.S. Cl.
USPC ............................ 709/206; 709/223; 715/752

(58) Field of Classification Search
USPC .................................. 709/206, 223; 715/752
See application file for complete search history.

(56) References Cited

U.S. PATENT DOCUMENTS

| | | | | |
|---|---|---|---|---|
| 6,161,130 | A * | 12/2000 | Horvitz et al. | 709/206 |
| 6,574,671 | B1 * | 6/2003 | Haynes | 709/245 |
| 7,529,804 | B1 * | 5/2009 | Lu et al. | 709/206 |
| 2002/0112015 | A1 * | 8/2002 | Haynes | 709/206 |
| 2002/0194284 | A1 * | 12/2002 | Haynes | 709/206 |
| 2009/0082043 | A1 * | 3/2009 | Lazaridis | 455/466 |
| 2010/0023585 | A1 * | 1/2010 | Nersu et al. | 709/206 |
| 2010/0076989 | A1 * | 3/2010 | Jakobson | 707/758 |
| 2010/0138754 | A1 * | 6/2010 | Wilson et al. | 715/752 |
| 2010/0198921 | A1 * | 8/2010 | Choi et al. | 709/206 |
| 2010/0299397 | A1 * | 11/2010 | Sambrani et al. | 709/206 |
| 2011/0035681 | A1 * | 2/2011 | Mandel et al. | 715/752 |
| 2011/0055333 | A1 * | 3/2011 | Guy et al. | 709/206 |
| 2011/0277034 | A1 * | 11/2011 | Hanson | 726/25 |

* cited by examiner

*Primary Examiner* — Oanh Duong

(57) ABSTRACT

A system includes an e-mail client including instructions configured to be executed by a processor. The e-mail client may be configured to receive a plurality of addresses specifying recipients of a message; apply a color coding to the plurality of addresses, the color coding indicating an associated color for at least one of the plurality of addresses; and send the message with the applied color coding to the plurality of addresses.

21 Claims, 12 Drawing Sheets

E-MAIL ADDRESSES IN COLOR

BACKGROUND

Compared to postal communications such as letters, electronic mail ("e-mail") typically routes to its destination in significantly less time. Moreover, the marginal cost of sending the same communication to an additional electronically-based destination is much lower than the cost of sending the same postal communication to a different postal address. Due to these and other advantages, it is no surprise that e-mail messaging has become such a popular method of sending and receiving messages.

However, due to the ease and low cost at which e-mail messages may be sent, an e-mail user may be inundated with messages. Moreover, many of these messages may be of limited importance to the user, who will then have to spend time determining which messages are of value.

DETAILED DESCRIPTION

Figure 1:
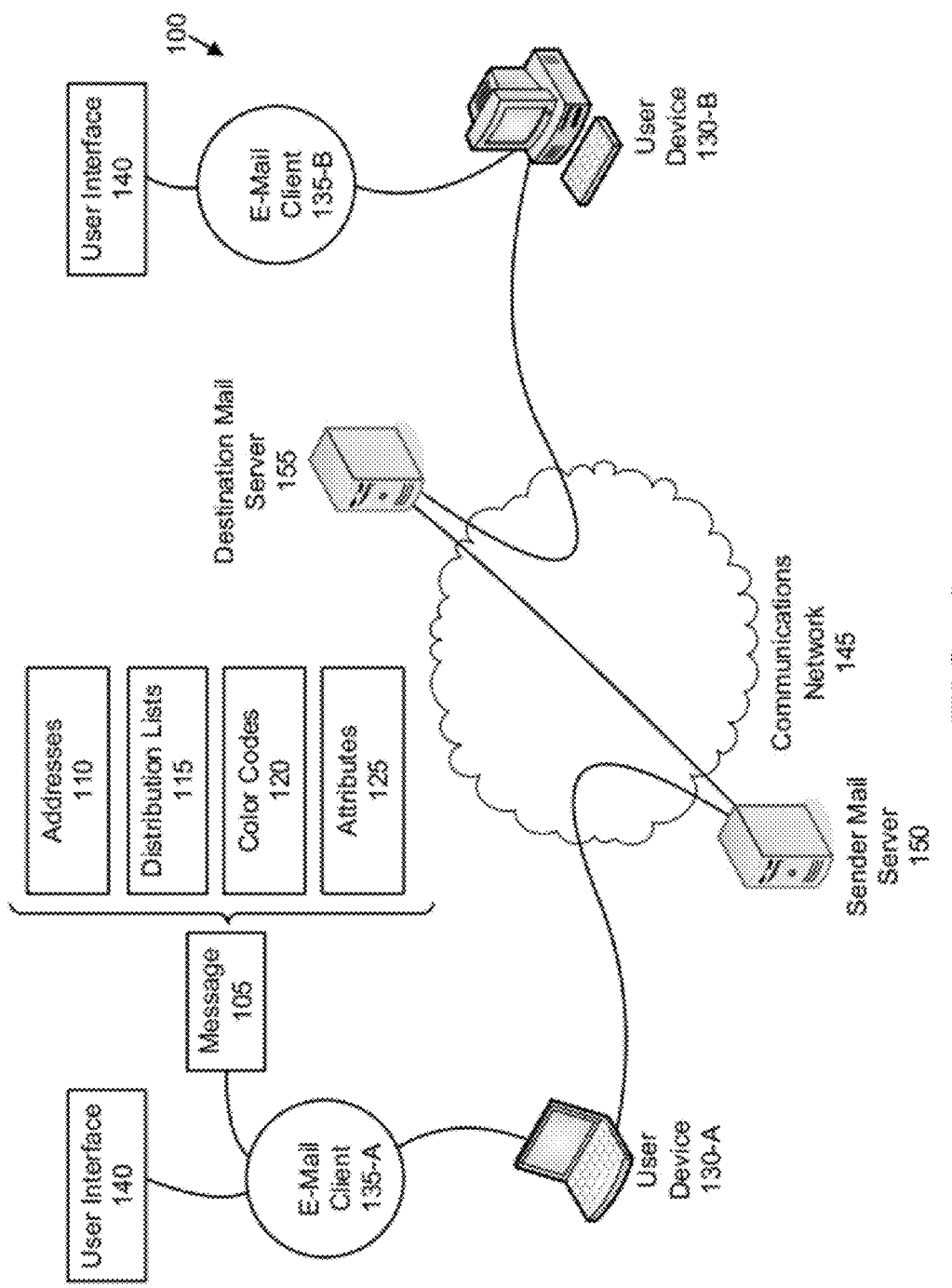
FIG. 1 illustrates an exemplary system for sending and receiving e-mail messages having color-coded e-mail addresses.

Organizations, such as community groups, professional organizations, and hobbyist clubs maintain distribution lists of interested parties such as their membership. These distribution lists may include the names and addresses of the interested parties (e.g., the members in the case of a membership list). The addresses may be of various types, such as postal addresses and e-mail addresses. In the exemplary illustration of a membership-based distribution, the membership list may also include additional information, such as any offices each individual member may hold or subgroups or boards in which the members may take part.

When sending out information to the whole of a distribution list (such as a membership list), it is likely that the information is not relevant to each intended recipient to the same extent. Accordingly, to indicate that a message is more likely to require action by certain recipients as compared to others, a sender of the message may color-code the e-mail addresses of the message recipients. Moreover, to indicate which information in a message is especially relevant to certain message recipients, the sender may further assign the same color-code to certain content within the body of the message.

The human eye is naturally drawn toward differences in color. Accordingly, the sender of the message may take advantage of this tendency and use color to draw the recipient's eye to certain information. Based on the color of the recipient's e-mail address, each recipient may readily be able to review the message and determine which information is important to him or her. Judicious use of color-coding within the message text may additionally be used to draw the recipient's eye to important items or to particular content requiring action by the color-coded portion of the message recipients.

As an example, a sender of a message may color-code the recipient e-mail addresses to indicate that an action needs to be taken by a subset of the recipients. For instance, an e-mail reminder that it is time to pay membership dues may be sent to a distribution list for an organization. The reminder may not be relevant to any members who have already paid their dues. To draw attention to the members who still need to pay, the sender may color code in red the e-mail addresses of each member owing dues. The sender may further note in the body of the message that if your e-mail address appears in red, then that means that you still need to pay your membership dues. Upon receipt of the message, a recipient whose address is indicated in red may readily discern that payment is required on his or her part.

As another example, a general newsletter for an organization may include sections that are especially applicable to an executive board of the organization, but may be included in the general newsletter so that the membership at large may be aware of the information. Sections applicable to the executive board may be highlighted in a color in the body of the message. Additionally, the e-mail addresses of the members of the executive board may be indicated in the same color. Thus, a recipient of the message may easily discern which content is especially applicable to the executive board, and may decide whether to review that particular portion of the message.

In some instances, the color-coding assigned to the message recipients may be stored for later use. For example, the color-coding may be stored as an association of color codes with the addresses included in a distribution list. As another example, the color-coding may be determined by the system based on attributes associated with addresses of the distribution list, where the attributes in turn may be associated with color codes. Moreover, in some instances the e-mail message may further be constructed to provide fallback support for e-mail clients unable to display e-mail addresses in color, such as by including a statement of the color coding within the body of the message.

While the messaging systems and methods described herein are illustrated with respect to e-mail messaging, the concepts disclosed herein are applicable to other messaging systems and protocols having a potential for multiple recipients, such as instant messaging, short message service (SMS)

messaging and multimedia messaging service (MMS) messaging, among other exemplary messaging types.

FIG. 1 illustrates an exemplary system 100 for sending and receiving e-mail messages 105 having color-coded e-mail addresses 110. As shown, the system 100 includes an e-mail client 135-A that is executed by a user device 130-A. The e-mail client 135-A may be configured to use one or more distribution lists 115 as input for the recipients of the message 105. The e-mail client 135-A may further be configured to provide a user interface 140 configured to receive input for a message 105 from a user, the input includes addresses 110, color codes 120, and attributes 125. The e-mail client 135-A may further be configured to format the input into a message 105 and send the message 105 over a communications network 145 to a sender mail server 150. The sender mail server 150 may be configured to receive the message 105 from the e-mail client 135-A and send the message 105 over the communications network 145 to a destination mail server 155. The destination mail server 155 may be configured to receive the message 105 from the sender mail server 150 and deliver the message 105 to the mailbox of the recipient. A recipient of the message 105 may then use an e-mail client 135-B executed by user device 130-B to receive and display the message 105. System 100 may take many different forms and include multiple and/or alternate components and facilities. While an exemplary system 100 is shown in FIG. 1, the exemplary components illustrated in Figure are not intended to be limiting. Indeed, additional or alternative components and/or implementations may be used.

The message 105 may include information in various formats, such as a plain text format or a hyper-text markup language (HTML) format. The information may also include embedded multimedia content such as graphics, sounds, and video. The message 105 may be addressed to one or more recipient addresses 110 who are to receive the message 105 once it is sent. The message 105 may further include a subject indicative of the contents of the message 105, as well as addresses 110 of the recipients of the message 105.

Distribution lists 115 may be identified by a name (e.g., "Organization Members," "Executive Boards," etc.), and may include a list of names and/or addresses 110 to which a message 105 may be sent. Rather than listing the recipient addresses 110 of the message 105, a user may instead specify a distribution list 115 as a recipient of a message 105. The message 105 may then be sent to each of the recipient addresses 110 included in the distribution list 115. Distribution lists 115 accordingly provide a convenient and efficient way to send e-mail messages to multiple recipient addresses 110 without having to provide a specific e-mail address 110 for each of the multiple recipients. In some instances distribution lists 115 may be stored on a server such as sender mail server 150. In other instances, distribution lists 115 may be stored locally on a user device 130 or in some other location readily accessible by an e-mail client 135.

Distribution lists 115 may further store additional information, such as color codes 120 associated with the addresses 110 of the distribution list 115. Color codes 120 are codes that indicate or otherwise specify a color that may be used to display, highlight or otherwise present the addresses 110 of the message 105.

Distribution lists 115 may further store attributes 125 of the addresses 110 included in the distribution list 115. An attribute 125 is an identifier, such as a word, phrase, or icon that may be associated with addresses 110 to indicate additional information associated with the address 110. For instance, each address 110 in a distribution list 115 of an organization may include an attribute 125 indicating whether or not the addressee paid his or her membership dues. As another alternative, each address 110 in the distribution list 115 for the organization may include an attribute 125 indicating whether the addressee is a member of the organization's executive board.

The user devices 130-A and 130-B may be a device or devices configured to be operated by one or more users, such as a cellular telephone, laptop computer, tablet computing device, personal digital assistant, or desktop computer workstation, among others. The user devices 130-A and 130-B may include one or more components capable of receiving input from a user, and providing output to the user. User devices 130 such as user devices 130-A and 130-B, may be implemented as a combination of hardware and software, and may include one or more software applications or processes for causing one or more computer processors to perform the operations of the user device 130 described herein.

The e-mail client 135 may be one such application included on the user device 130, and may be implemented at least in part by instructions stored on one or more non-transitory computer-readable media. Sometimes referred to as a mail user agent (MUA), the e-mail client 135 may be configured to provide a user interface 140 to allow for the operation and control of the messaging functions of user device 130. The e-mail client 135 may further provide feedback and other output to the user through the user interface 140 to aid the user in making operational decisions with respect to the messaging system. Exemplary user interfaces 140 may make use of hardware included in the user devices 130, such as keyboards, buttons, and microphones, display screens and loudspeakers.

E-mail clients 135 may be implemented by way of one or more web pages displayed by the user device 130 in a web browser software program. Such a web-based e-mail client 135 may accept input from a user from one or more controls on a web page user interface 140 and may provide output by displaying web pages to the user including system status or other outputs of the system 100. In other examples, the e-mail client 135 may be implemented by way of a client-side application installed as software on the user device 130. Exemplary e-mail clients 135 include Verizon Webmail provided by Verizon Communications of New York City, N.Y.; Microsoft Outlook and Hotmail provided by Microsoft Corporation of Redmond, Wash.; Mail provided by Apple Corporation of Cupertino, Calif.; and Google Gmail provided by Google, Inc. of Mountain View, Calif.

The e-mail client 135 may include instructions configured to provide user interfaces 140 to receive input from a user from which to send a message 105. The input may include a subject for the message 105, the contents of the message 105, and the intended recipients of the message 105. As some examples, the recipients of the message 105 may be specified by name, e-mail address 110, and/or distribution list 115.

In some instances, the e-mail client 135 may include instructions configured to provide user interfaces 140 for the creation, modification, selection, and deletion of distribution lists 115. The e-mail client 135 may further include instructions configured to provide user interfaces 140 to allow for the creation, modification, selection, and deletion of color code 120 assignments or attributes 125 to the addresses 110 of a distribution list 115 or a message 105. The e-mail client 135 may further include instructions configured to cause the user device 130 to display the color-coded 120 recipient addresses 110 in a user interface 140 for a received message 105. To allow for fallback support in instances where the e-mail client 135 or the user device 130 does not implement color code 120 functionality, the e-mail client 135 may further be configured to create the message 105 in a format where the color code 120 or attribute 125 information is viewable by an e-mail client lacking color-code 120 support. Discussion of the color-coding of e-mail addresses 110 is discussed in further detail with respect to FIGS. 2-13.

The communications network 145 may include one or more interconnected networks that provide communications services, such as Internet access, VoIP communication services, SMS messaging services, MMS messaging services, and location services, to at least one connected device.

The sender mail server 150, sometimes referred to as local mail transfer agent (MTA), may be configured to receive messages over the communications network 145. The sender mail server 150 may further be configured to review the recipient address 110 provided in the messages, resolve a domain name to determine the fully-qualified domain name of the destination mail server 155, and send the message 105 over the communications network 145 to the destination mail server 155.

The destination mail server 155, sometimes referred to as a mail delivery agent (MDA), may be configured to receive the message 105 from the sender mail server 150 and deliver the message 105 to the mailbox of the recipient. The destination mail server 155 may be configured to utilize post office protocol 3 (POP3) and/or Internet message access protocol (IMAP) to allow for the selective delivery of messages 105 to e-mail clients 135, such as e-mail client 135-B.

In general, computing systems and/or devices, such as user devices 130, sender mail server 150, and destination mail server 155, may employ any of a number of computer operating systems, including, but by no means limited to, versions and/or varieties of the Microsoft Windows® and Windows Phone operating systems, the Unix operating system (e.g., the Solaris® operating system distributed by Sun Microsystems of Menlo Park, Calif.), the AIX UNIX operating system distributed by International Business Machines of Armonk, N.Y., the Mac OS X and iOS operating systems distributed by Apple Inc. of Cupertino, Calif., the BlackBerry OS distributed by Research In Motion of Waterloo, Canada, the Linux operating system, and the Android operating system developed by the Open Handset Alliance.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
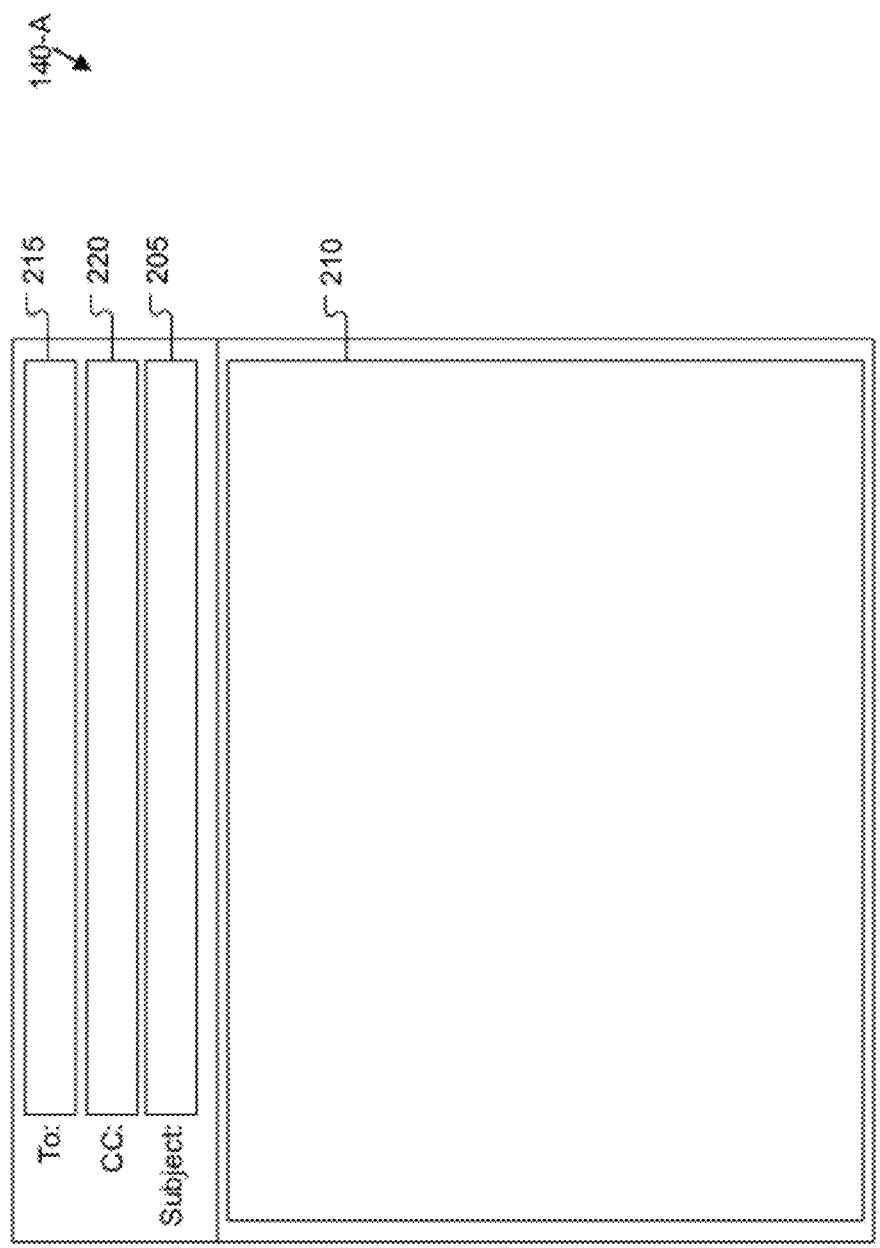
FIG. 2 illustrates an exemplary user interface for the receipt of information for a message.

FIG. 2 illustrates an exemplary user interface 140-A for the receipt of information for a message 105. The user interface 140-A may be provided by the e-mail client 135-A, and may be displayed to a sender of a message 105. As shown, the user interface 140-A includes a subject field 205, a body text field 210, and address 110 fields including a TO address field 215, and a CC address field 220.

The subject field 205 of the message may be used to indicate to the recipients the subject of the message 105, and the body text field 210 may be used to include the actual information to be sent. The body text field 210 may include data in various formats, such as text-only or hyper-text markup language (HTML) formats. The body text field 210 may further include embedded multimedia content through use of multi-purpose Internet mail extensions (MIME) such as those standardized in RFCs 2045 through 2049.

A message 105 is written to one or more recipients to whom the information is to be sent. These recipients may be added to the TO address field 215 of the user interface 140-A. For example, the TO address field 215 may allow for the sender to manually type in the addresses 110 of one or more recipients to receive the message. In other example, the sender may select addresses 110 or distribution lists 115 from an address book. The user interface 140-A may accordingly allow for a user to specify the recipients according to their names or e-mail addresses 110.

In addition to the recipients listed the TO address field 215, additional recipients may be listed in the carbon copy (CC) address field 220. Recipients may be placed in the CC address field 220 rather than in the TO address field 215 to indicate additional recipients that should receive a copy of the message 105. Recipients of the message 105 generally may view the addresses 110 listed in the TO address field 215 and the CC address field 220, and may therefore see who else was sent a copy of the message 105.

While not shown, in some examples the user interface 140-A may include a blind carbon copy (BCC) address field. The BCC address field may be used to list addresses 110 of recipients to receive a copy of the message, but that will not be seen as having received a copy of the message by the other recipients of the message 105.

Once the recipients and the message content are specified for a message 105, the sender may indicate to the e-mail client 135 that the message 105 is ready to be sent. For example, the sender may press a send button on a user interface 140 of the e-mail client 135. Upon such a selection, the message 105 may be sent on to the sender's mail server 150 for delivery.

Figure 3:
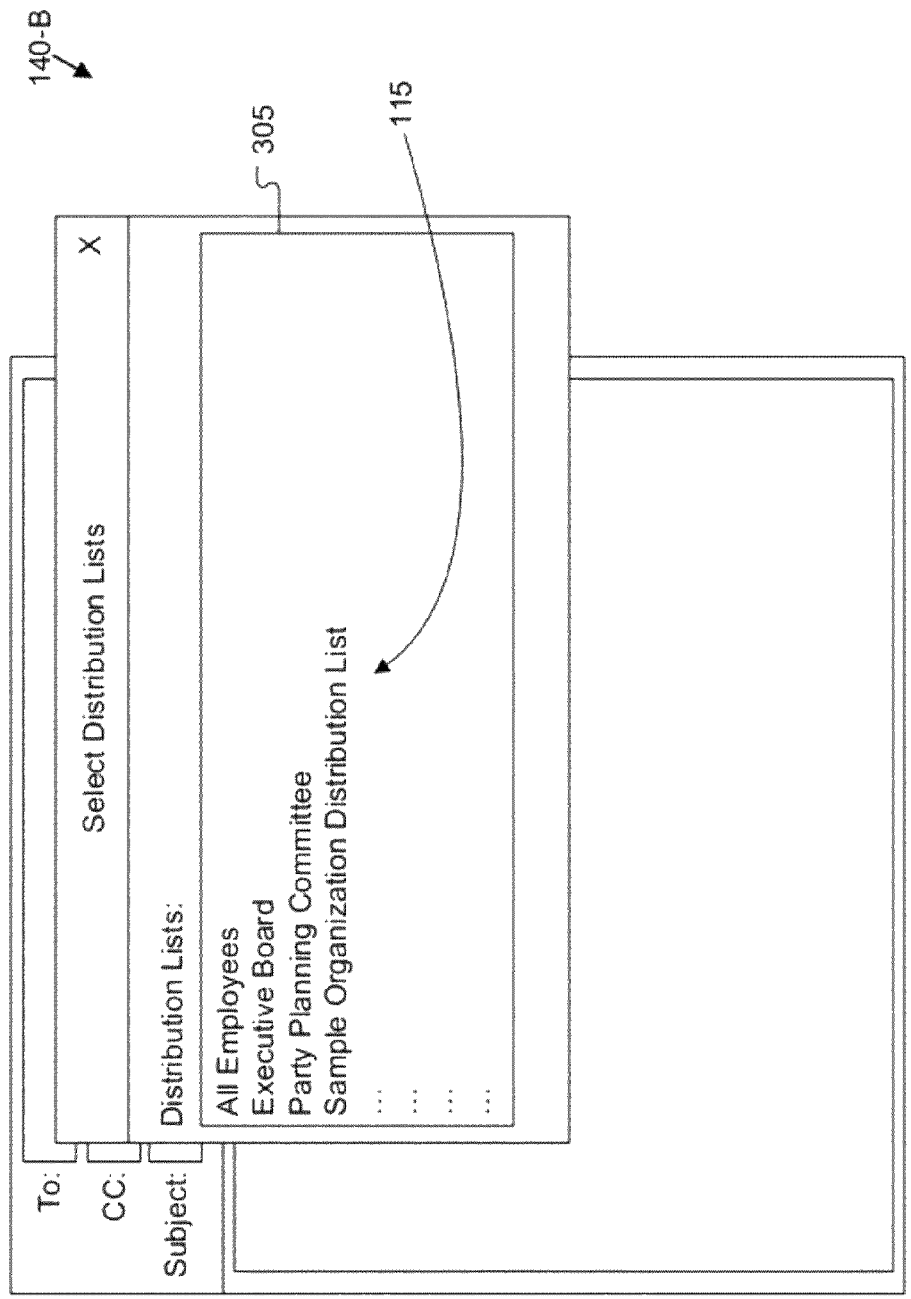
FIG. 3 illustrates an exemplary user interface for the specification of a distribution list.

FIG. 3 illustrates an exemplary user interface 140-B for the specification of a distribution list 115. As noted above, a sender may select one or more distribution lists 115 to specify recipients for a message 105 within an address field. Upon receiving an indication that the sender wishes to browse for a distribution list 115, a user interface 140-B may be provided by the e-mail client 135-A to allow the sender to select from the available distribution lists field 305. One or more selected distribution lists 115 may accordingly be added to an address field of the message 105.

In some instances, the distribution lists 115 are added to the address field as the name of the distribution list 115, while in other instances each of the addresses 110 included within the selected distribution list 115 or lists 115 are added to the address field directly. In some examples, the user interface 140-B may include controls to allow a user to add a selected distribution list field 305 to a particular address field of the message 105, such as to the TO address field 215, the CC address field 220, or the BCC address field.

When adding a distribution list 115 to the address fields of the message 105 (e.g., TO address field 215, CC address field 220, etc.), the sender of the message 105 may desire to color certain e-mail addresses 110 for the message 105 being sent. For example, the sender may specify the desired colors by assigning color codes 120 to certain e-mail addresses 110 in the distribution lists 115.

Figure 4:
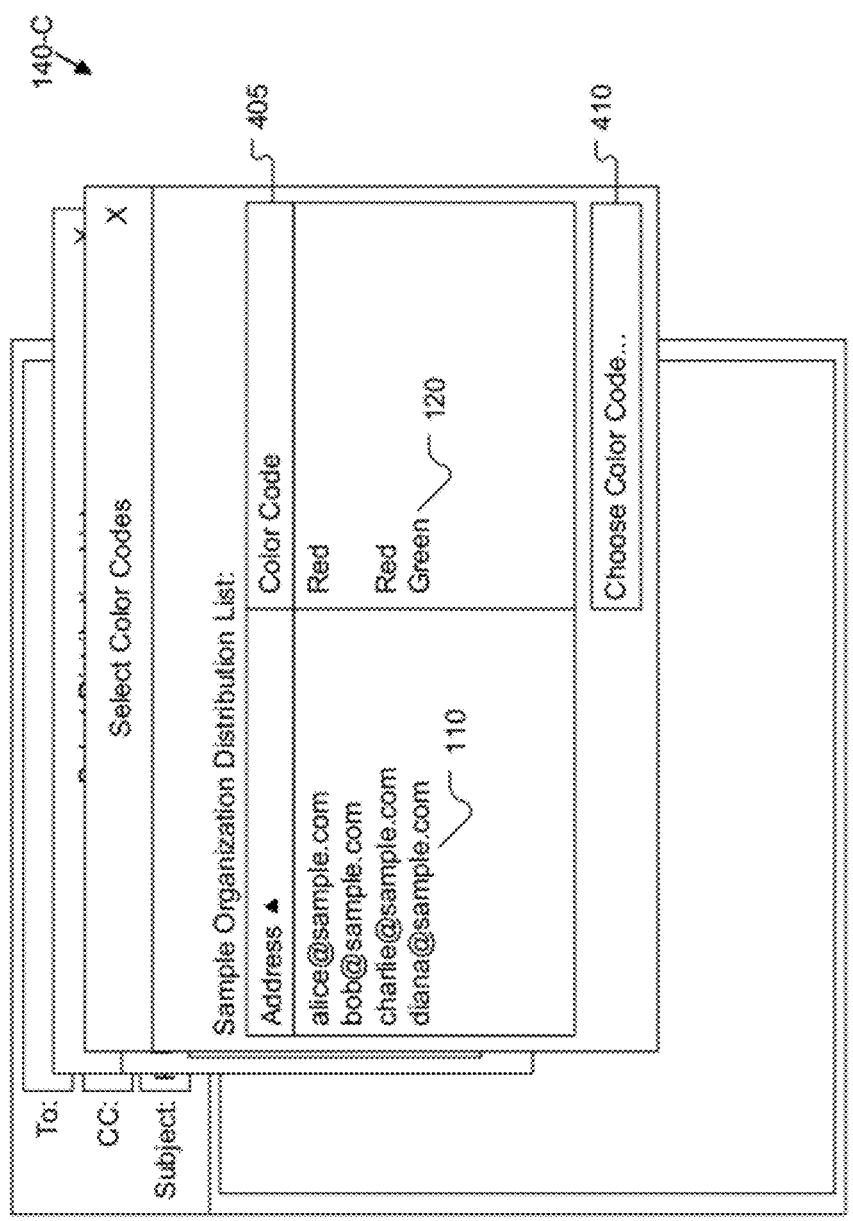
FIG. 4 illustrates an exemplary user interface for the specification of color-coding for e-mail addresses of recipients of a message.

FIG. 4 illustrates an exemplary user interface 140-C for the specification of color codes 120 for a distribution list 115. The user interface 140-C may be provided by the e-mail client 135-A upon receipt of an indication that the user wishes to color code one or more of the e-mail addresses 110 included in a distribution list 115.

The user interface 140-C includes a listing 405 of each of the addresses 110 included in the selected distribution list 115 (i.e., "Sample Organization Distribution List"). For each e-mail address 110, the listing 405 further lists a color code 120 to which the e-mail address 110 is assigned. The sender may alter the listing of color codes 120 by selecting one or more of the addresses 110, and then selecting the choose color control 410. Upon selection of the choose color control 410, the user interface 140-C may provide a color chooser control, such as a color palette or a listing of available colors, to allow the sender to select a custom color in which to display the e-mail addresses 110. If any color changes are made, the sender may be asked if the color codes 120 assigned to the e-mail addresses 110 should be saved with the distribution list 115.

As shown in FIG. 4, "alice@sample.com" and "charlie@sample.com" are each associated with the "Red" color code 120; "diana@sample.com" is associated with the "Green" color code 120; and "bob@sample.com" is not associated with any color code 120.

In some instances, it may be possible for a single address 110 to be associated with multiple color codes 120 simultaneously. In such an instance, the address 110 may be displayable in multiple colors, such as by flashing between the multiple colors, using a striped format including the multiple colors, being displayed partially in one color and partially in another, etc.

Figure 5:
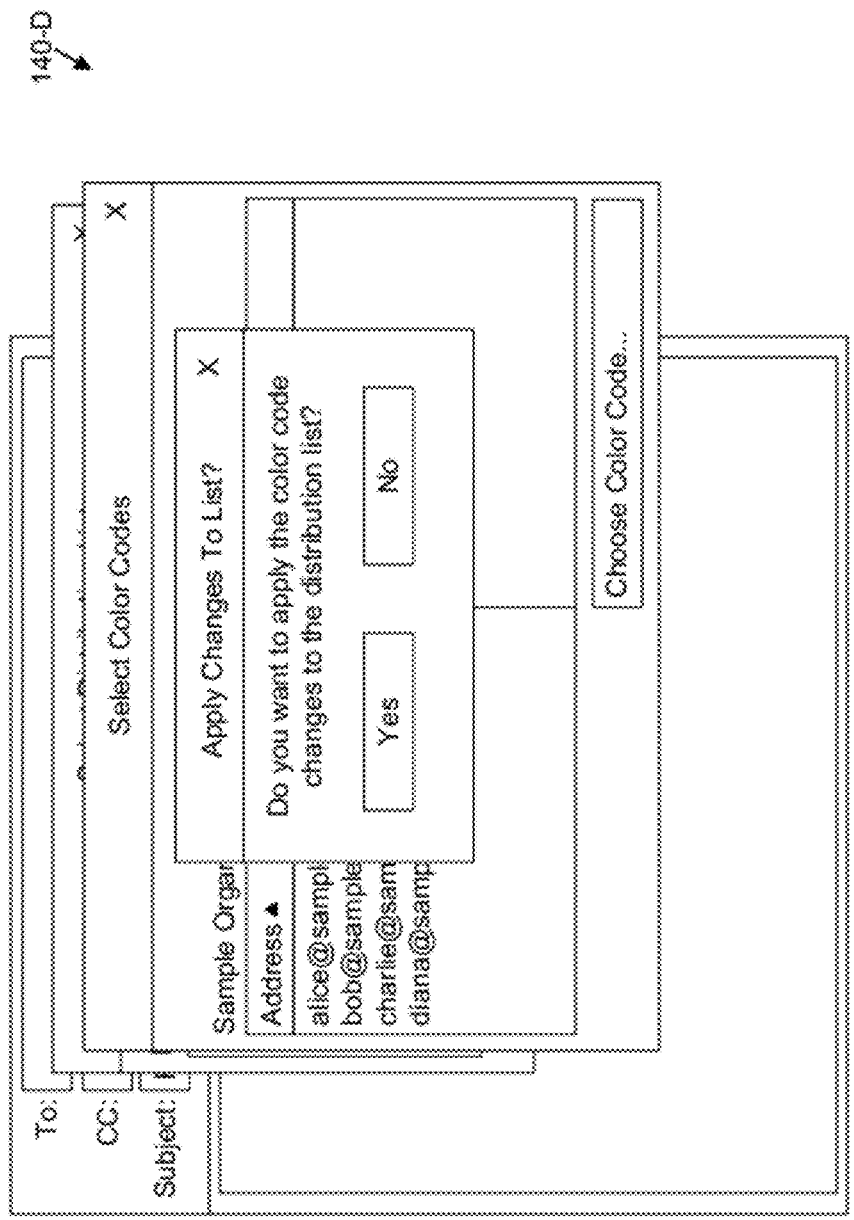
FIG. 5 illustrates an exemplary user interface configured confirm that a color-coding should be saved to a distribution list.

FIG. 5 illustrates an exemplary user interface 140-D configured to confirm that the color codes 120 should be saved to the distribution list 115. The sender may choose yes to save the color code 120 changes with the distribution list 115 for further use, or may choose no if these color code 120 changes are to be used for the current message 105 only.

Rather than specifying color codes 120 to be assigned to certain e-mail addresses 110 in a distribution list 115, colors may be assigned to the e-mail addresses 110 based on attributes 125 associated with the addresses 110 in the distribution list 115. Then, all e-mail addresses 110 associated with a particular attribute 125 may be assigned the same color-code 120. This accordingly allows for colors to be assigned to recipients of a message 105 according to the underlying meaning of the color code 120, as opposed to by color directly.

Figure 6:
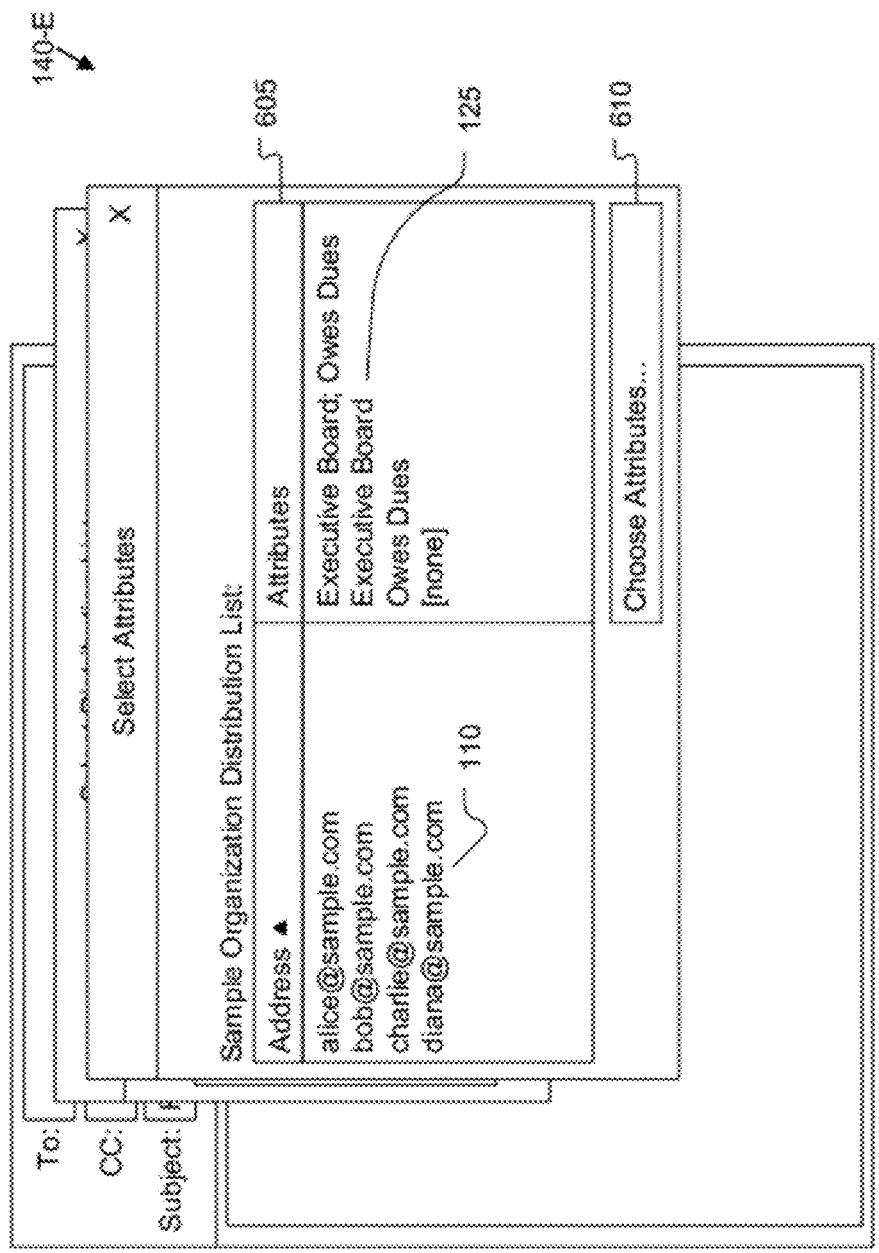
FIG. 6 illustrates an exemplary user interface for the specification of attributes that may be associated with e-mail addresses of recipients of a message.

FIG. 6 illustrates an exemplary user interface 140-E for the specification of attributes 125 that may be associated with e-mail addresses 110 of recipients of a message 105. The user interface 140-E may be provided by the e-mail client 135-A upon receipt of an indication that the user wishes to view or modify the attributes 125 associated with e-mail addresses 110 included in a distribution list 115.

The user interface 140-E includes a listing 605 of each of the addresses 110 included in the selected distribution list 115 (i.e., "Sample Organization Distribution List"). For each listed address 110, the listing 605 further lists any attributes 125 associated with the e-mail addresses 110. The sender may alter the attributes 125 by selecting one or more of the addresses 110, and then selecting the choose attributes control 610. Upon selection of the choose attributes control 610, the user interface 140-E may provide a listing of available attributes 125 from which a user may select. If any changes to the attributes 125 of the addresses 110 of the distribution list 115 are made, the sender may be asked if the changes should be saved to the distribution list 115.

As shown in FIG. 6, "alice@sample.com" is associated with "Executive Board" and "Owes Dues" attributes 125; "bob@sample.com" is associated with the "Executive Board" attribute 125; "charlie@sample.com" is associated with the "Owes Dues" attribute 125; and "diana@sample.com" is not associated with any attributes 125.

While the user interface 140-E is illustrated in the context of composition of a message 105, the user interface 140-E may also be provided to allow for editing of the distribution list 115 in other situations, such as during maintenance of the distribution listing 115 unrelated to the sending of a particular message 105.

Figure 7:
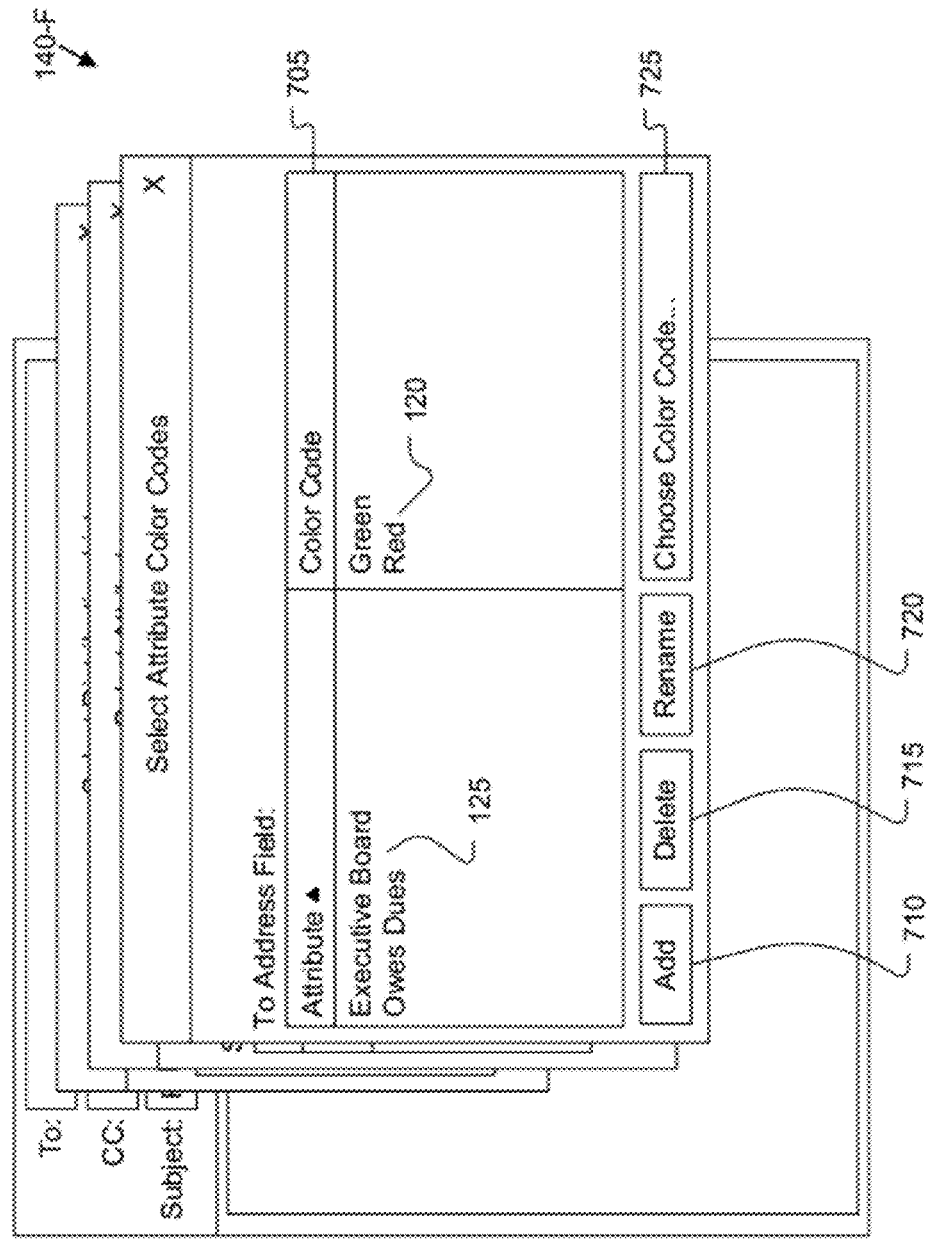
FIG. 7 illustrates an exemplary user interface for the maintenance of address attributes and associated color codes.

FIG. 7 illustrates an exemplary user interface 140-F for the maintenance of attributes 125 and associated color codes 120. The user interface 140-F may be provided by the e-mail client 135-A upon receipt of an indication that the user wishes to view or modify address attributes 125 available to be associated with addresses 110 in a distribution list 115. The user interface 140-F may accordingly display an attribute listing 705 of each of the attributes 125 available, as well as provide controls for the management of the attributes 125 such as an add control 710, a delete control 715, a rename control 720, and a choose color control 725.

The attribute listing 705 may be configured to display of each of the attributes 125 available for being associated with an address 110 of a distribution list 115. In some examples, the attributes 125 are associated only with a single distribution list 115, while in other examples the attributes 125 may be available for use in multiple distribution lists 115.

The add control 710 may be configured to allow a user to create a new attribute 125. Upon selection of the add control 710 the user interface 140-F may prompt the user for a new name and/or color code 120 for the new attribute 125 to be added.

The delete control 715 may be configured to allow a user to delete an attribute 125. Upon selection of the delete control 715 the user interface 140-F may delete any attributes 125 that are selected in the attribute listing 705. Because some attributes 125 may be used by multiple users or in multiple distribution lists 115, the user interface 140-F may be configured to prompt the user before deleting an attribute 125 in use by multiple users or distribution lists 115. For example, the user interface 140-F may be configured to display a prompt to confirm that upon deletion of the attribute 125, existing users or distribution lists 115 with the attribute 125 will no longer include the deleted attribute 125 and/or associated color code 120.

The rename control 720 may be configured to allow a user to rename an attribute 125. Upon selection of the rename control 720, the user interface 140-F may prompt the user for a new name for an existing attribute 125 that is selected in the attribute listing 705. When renaming an attribute 125, all users linked to the attribute 125 may also have their attribute 125 renamed. For example, if two users are utilizing an attribute 125 named "Late," and one of the users desires to rename the attribute to "Past Due," the user interface 140-F may be configured to prompt the user to confirm that the change should be made for all users and distribution lists 115. If this is not the user's intent, then the user may instead create a new attribute 125 with the new name, for example using the add control 710.

The choose color control 725 may be configured to allow a user to associate a color code 120 with an attribute 125. Upon selection of the choose color control 725, the user interface 140-F may provide a color chooser control, such as a color palette or a listing of available colors, to allow the user to select a custom color to be associated with the attribute 125.

As shown in FIG. 7, an "Execute Board" attribute 125 is associated with the color code 120 "Green," and an "Owes Dues" attribute 125 is associated with the color code 120 "Red." Thus, the e-mail client 135 may accordingly determine that any address 110 associated with the "Execute Board" attribute 125 should automatically be colored green, and any address 110 associated with the "Owes Dues" attribute 125 should automatically be colored red.

In cases where an address 110 is associated with multiple attributes 125 at once, one of the attributes 125 may take priority (such as the first attribute 125 listed), or the address 110 may be displayed in multiple colors. Some examples of displaying the addresses 110 in multiple colors include alternating the color of every other character of the address 110, flashing or rotating among two or more colors, displaying the address 110 in a striped format of the associated colors, and/or displaying the address 110 partially in one color and partially in another, etc. As an alternative, if an address 110 is associated with multiple color codes 120 or attributes 125, the address 110 may appear multiple times, once for each color. Or, an e-mail client 135 may display separate lists of the addresses 110 associated with each color code 120, further allowing for the display of the same address 110 in multiple lists.

The user interface 140-F may rely on a user to keep the attributes 125 and color codes 120 for a distribution list 115 updated. However, rather than relying on a user to update the attributes 125 or color codes 120, in some instances the attributes 125 or color codes 120 may be updated automatically by the system. To accomplish this, an e-mail client 135 may be configured to pull attributes 125 or color codes 120 from a data store, such as a database, spreadsheet or file. The e-mail client 135 may further use the pulled data to update the attributes 125 or color codes 120 of the addresses 110 of the message 105 or distribution list 115.

Continuing with the example of membership dues, a user of the e-mail client 135 may maintain a spreadsheet that includes a row for each of the members of a group, a first column indicating the address 110 of the member, and a second column indicating whether the member for that row has paid his or her dues. The user may associate the second column of the spreadsheet with an attribute 125 or color code 120 indicating whether or not dues are paid. The e-mail client 135 may then pull the information from the spreadsheet and use the data to add or remove attribute 125 or color codes 120, as appropriate, to match whether or not dues are paid to the appropriate addresses 110. These updates may be performed periodically to a distribution list 115, upon indication by a user, or automatically to the addresses 110 of a message before the message 105 is sent.

In some instances a user may desire to send an e-mail with color-coded 120 addresses 110 without using a distribution list 115 at all. In such an example, a user may enter one or more addresses 110 into the address fields of a message 105, and may select color codes 120 for the addresses 110 directly.

Figure 8:
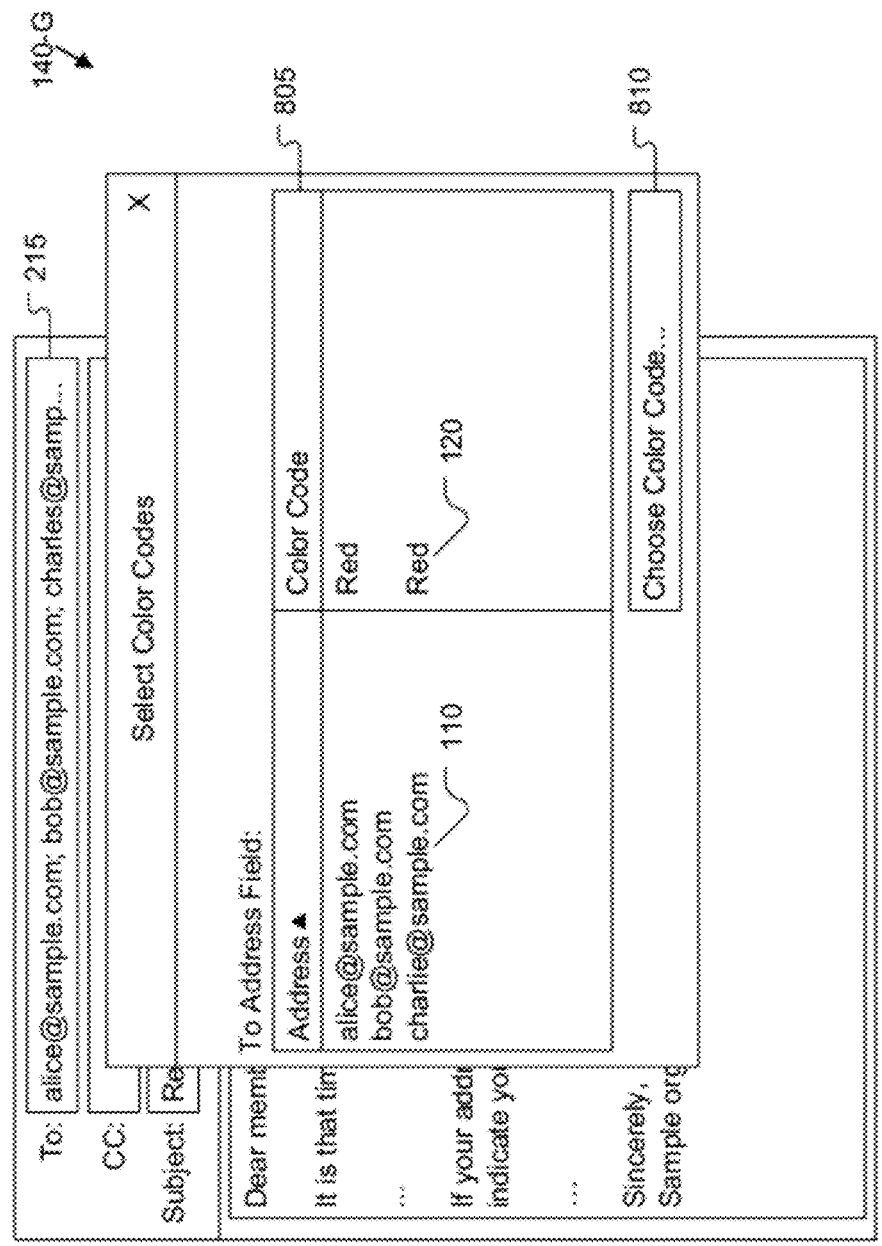
FIG. 8 illustrates an exemplary user interface of a message providing for the selection of a color-coding for e-mail addresses, without a distribution list.

FIG. 8 illustrates an exemplary user interface 140-G of a message 105 providing for the selection of color codes 120 for e-mail addresses 110, without a distribution list 115.

The user interface 140-G includes a listing 805 of each of the addresses 110 to which the message 105 is addressed. For each listed address 110, the listing 805 further lists a color code 120 according to which the e-mail address 110 is to be displayed. The sender may alter the listing of color codes 120 by selecting one or more of the addresses 110, and then selecting the choose color control 810. Upon selection of the choose color control 810, the user interface 140-G may provide a color chooser control, such as a color palette or a listing of available color codes 120, to allow the user to select a custom color in which to display the e-mail addresses 110.

As shown in FIG. 8, "alice@sample.com" and "charlie@sample.com" are each associated with the "Red" color code 120; while "bob@sample.com" is not associated with any color code 120.

Figure 9:
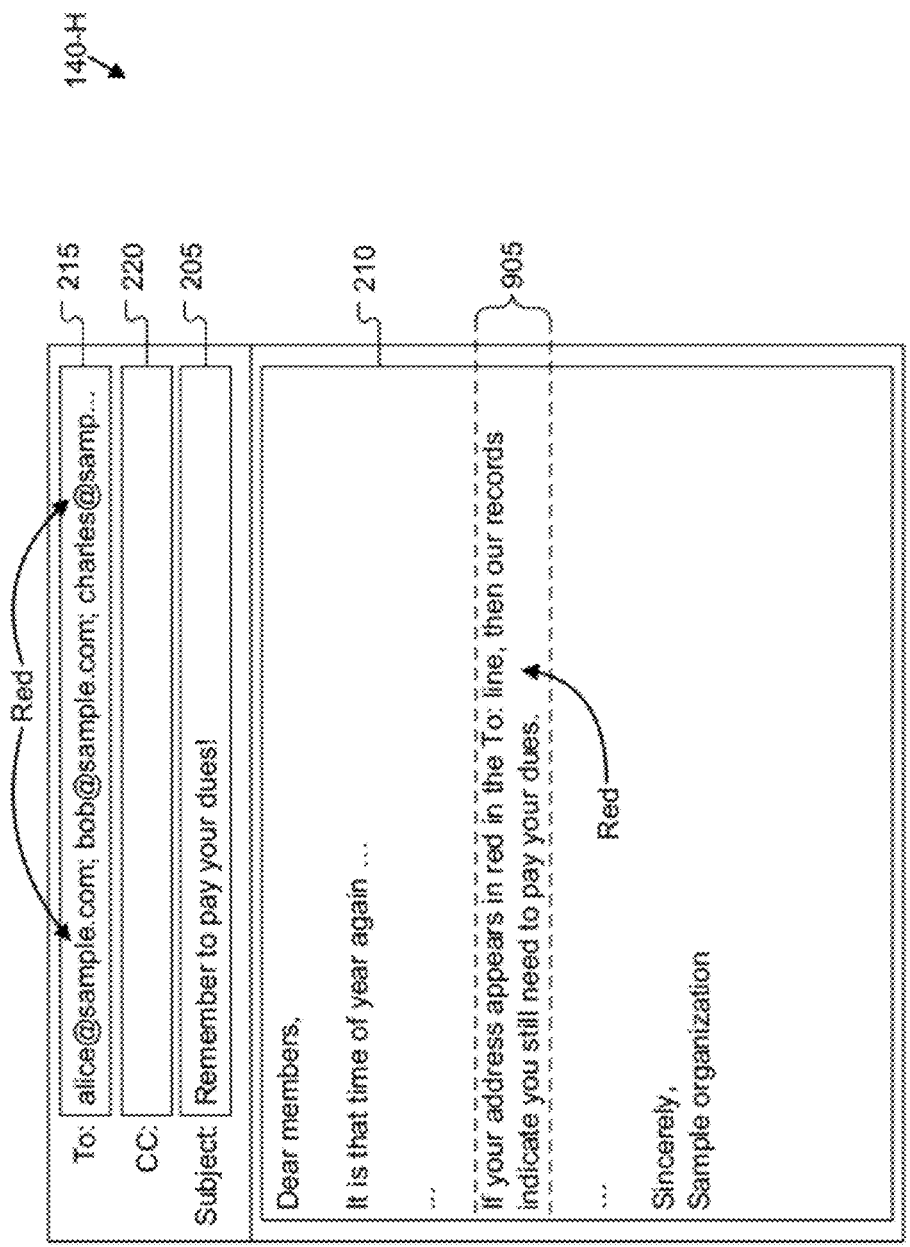
FIG. 9 illustrates an exemplary user interface of a message including color-coded e-mail addresses ready to be sent.

FIG. 9 illustrates an exemplary user interface 140-H of a message 105 including color-coded 120 e-mail addresses 110 ready to be sent. The message 105 includes a list of color-coded 120 e-mail addresses 110 in the TO address field 215 that are to receive the message 105. The color-coded 120 addresses 110 may have been determined through one or more of the approaches discussed above, including assigning color codes 120 to addresses 110 in a distribution list 115, assigning color codes 120 to attributes 125 of addresses 110 in a distribution list 115, or assigning color codes 120 to addresses 110 directly.

The message 105 may further be displayed with an indication 905 configured to inform the recipients of the message 105 of the underlying meaning of the color codes 120 of the e-mail addresses 110. For example, an indication 905 may be manually added to the body field 210 of the message 105 by the sender. As shown in FIG. 9, the indication 905 states that "If your address appears in red in the TO: line, then our records indicate you still need to pay your dues."

In other instances, an indication 905 may automatically be generated and provided in user interface 140-H based on the mapping of color codes 120 and attributes 125 assigned to the addresses 110. Merely by way of example, an automatically generated indication 905 may state "Your address appears in 'Red'. An address indicated in 'Red' is associated with the 'Owes Dues' attribute." Such an automatically-generated indication 905 may be generated by the e-mail client 135-A based on one or more addresses 110, distribution lists 115, color codes 120, and attributes 125 when sending the message 105.

Further, the indication 905 may be provided in the user interface 140-H in the same color as the associated color code 120 for the e-mail addresses 110 to which it refers. This use of the same color for the addresses 110 and for the indication 905 may thus facilitate a connection by the recipients between the color of the address 110 and the underlying meaning expressed by the color. For example, the indication 905 of the underlying meaning of the red e-mail addresses 110 may be colored in red to draw a connection between the red e-mail addresses 110 and those users who still need to pay their dues.

Once a message 105 is ready to be sent, the sender may press a send button on a user interface 140 of the e-mail client 135. This may then cause the e-mail client 135 to communicate with sender mail server 150 to facilitate delivery of the completed message 105 to the intended recipients. For instance, the e-mail client 135 may communicate with the sender mail server 150 through use of the simple message transfer protocol (SMTP) described in RFC 2821 and RFC 1123.

In some examples, the e-mail client 135 may use an extension to SMTP as defined in RFC 1869 to define one or more additional SMTP commands to send to sender mail server 150 to specify which e-mail addresses are to appear in what color. The sender mail server 150 may be configured to recognize these SMTP extensions and accordingly add optional-fields to the header of the message 105 that include the received e-mail address 110 color coding information. The optional-fields of an e-mail message 105 are described in detail in RFC 2822.

In other examples, the e-mail client 135 may include the color information in the body 210 of the message 105. In such an example, an e-mail client 135 that receives the message 105 and that supports e-mail addresses 110 in color may strip the color information from the body 210 of the message 105 and use it to display the requisite color-coding. Further, an e-mail client 135 that receives the message 105 and that does not supports e-mail addresses 110 in color may receive the message 105 and be able to display it as-is, providing the color coding information at least in the body 210 of the message 105 as a fallback.

Figure 10:
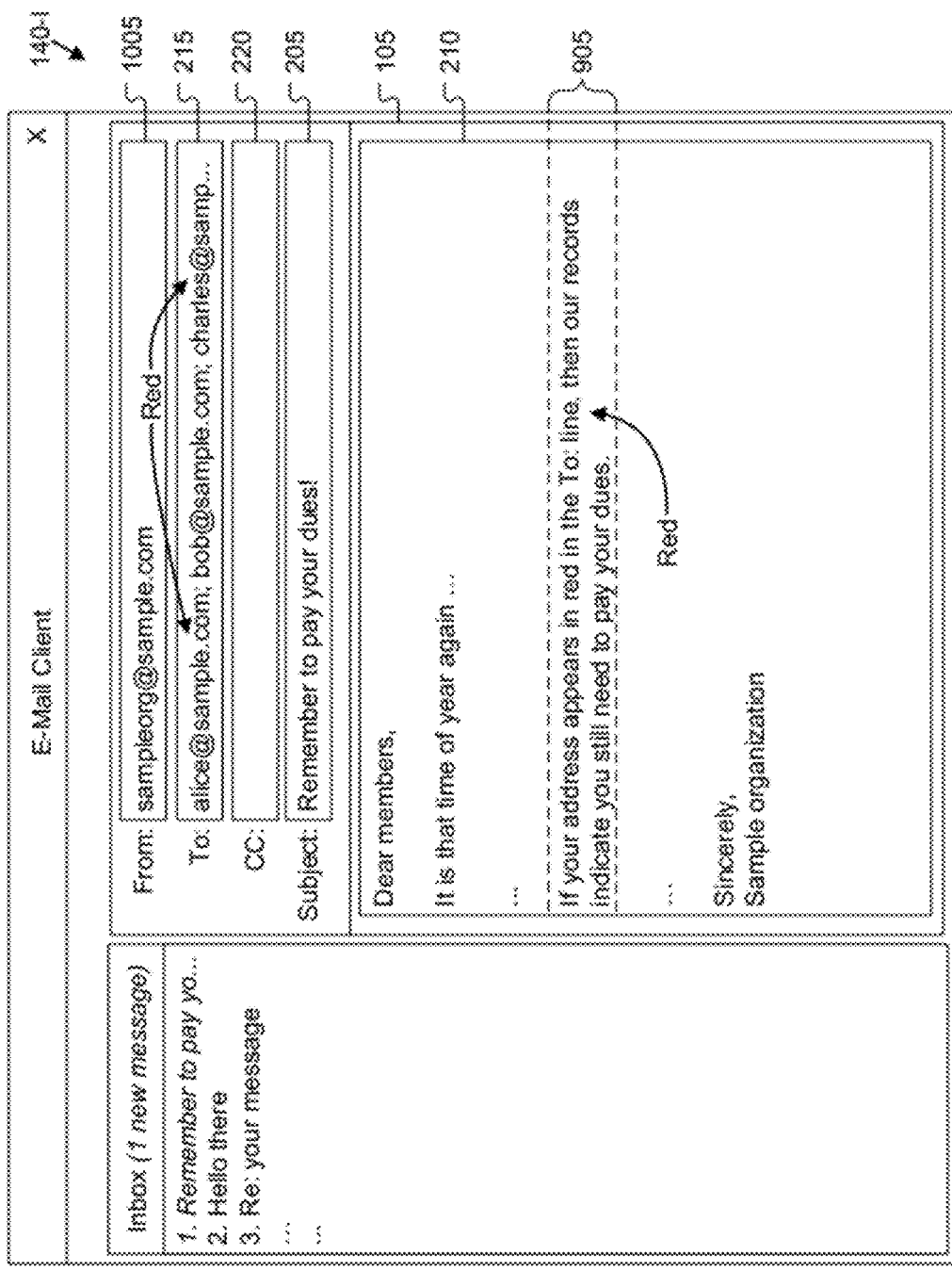
FIG. 10 illustrates an exemplary user interface of an e-mail client configured to display a received message having color-coded addresses.

FIG. 10 illustrates an exemplary user interface 140-I of an e-mail client 135 configured to display a received message 105 from a sender 1005 having color-coded addresses 110. The user interface 140-I accordingly provides an example of an e-mail client 135 capable of displaying e-mail addresses 110 in color. As shown in the user interface 140-I, the addresses 110 of certain recipients of the message 105 are displayed in color. Also as shown in the user interface 140-I, the message 105 is displayed providing an indication 905 of the underlying meaning of the color-coding of the e-mail addresses 110.

Figure 11:
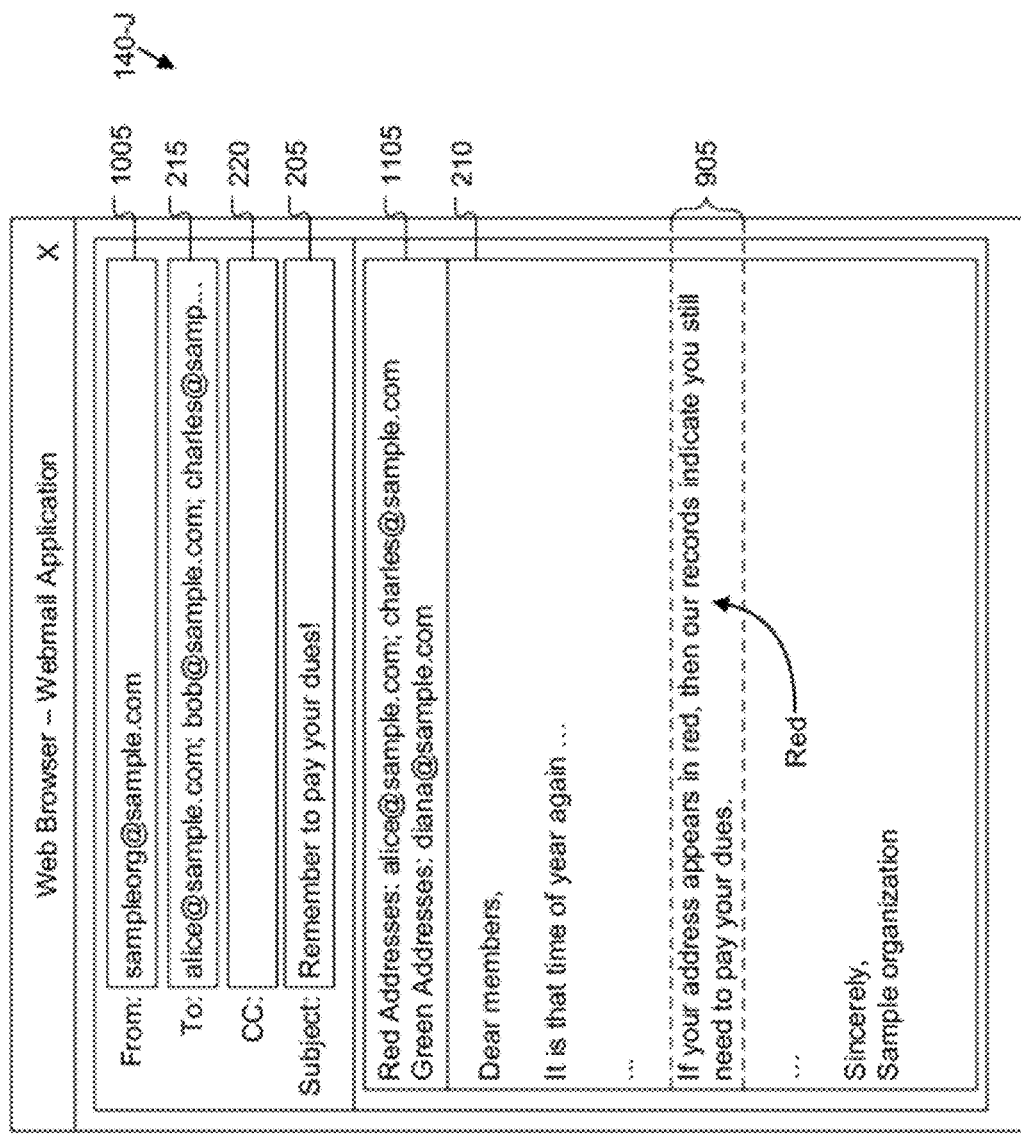
FIG. 11 illustrates an exemplary user interface of an e-mail client that lacks the ability to display color-coded e-mail addresses.

FIG. 11 illustrates an exemplary user interface 140-J of an e-mail client 135 that lacks the ability to display e-mail addresses 110 in color.

To allow for a recipient having an e-mail client 135 to view the color-coded e-mail addresses 110, the sending e-mail client 135 may be configured to include a section 1105 in the body text field 210 of the message that includes the e-mail addresses 110 specified according to their color. The section 1105 may be hidden from the message by an e-mail client 135 supporting the display of e-mail addresses 110 in color. In fact, in some instances the section 1105 may be parsed by the e-mail client 135 illustrated in user interface 140-I in order to receive and display the color information for the e-mail addresses 110. Thus, e-mail clients 135 that do not have support for e-mail addresses 110 in color may display the section 1105, while e-mail clients 135 that do have support for e-mail addresses 110 in color may parse and hide the section 1105.

For e-mail clients 135 that support color-coding within the body text field 210 (such as e-mail clients 135 that support HTML format messages 105), the section 1105 may be displayed in the appropriate colors. For example, some or all of the line "Red Addresses: alice@sample.com; charles@sample.com" included in the exemplary section 1105 may be displayed in red, while some or all of the line "Green Addresses: diana@sample.com" may be displayed in green. To support e-mail clients 135 that fail to even support color formatting in the body text field 210, such as terminal-based e-mail clients 135, the section 1105 may accordingly indicate the name of the colors as well.

Thus, clients that do not support e-mail addresses 110 in color, or even message 105 text in color, may still be able to view the message 105 including enough information for the recipient to be able to understand which recipient addresses 110 have been indicated as being shown in what colors.

Figures 12, 13:
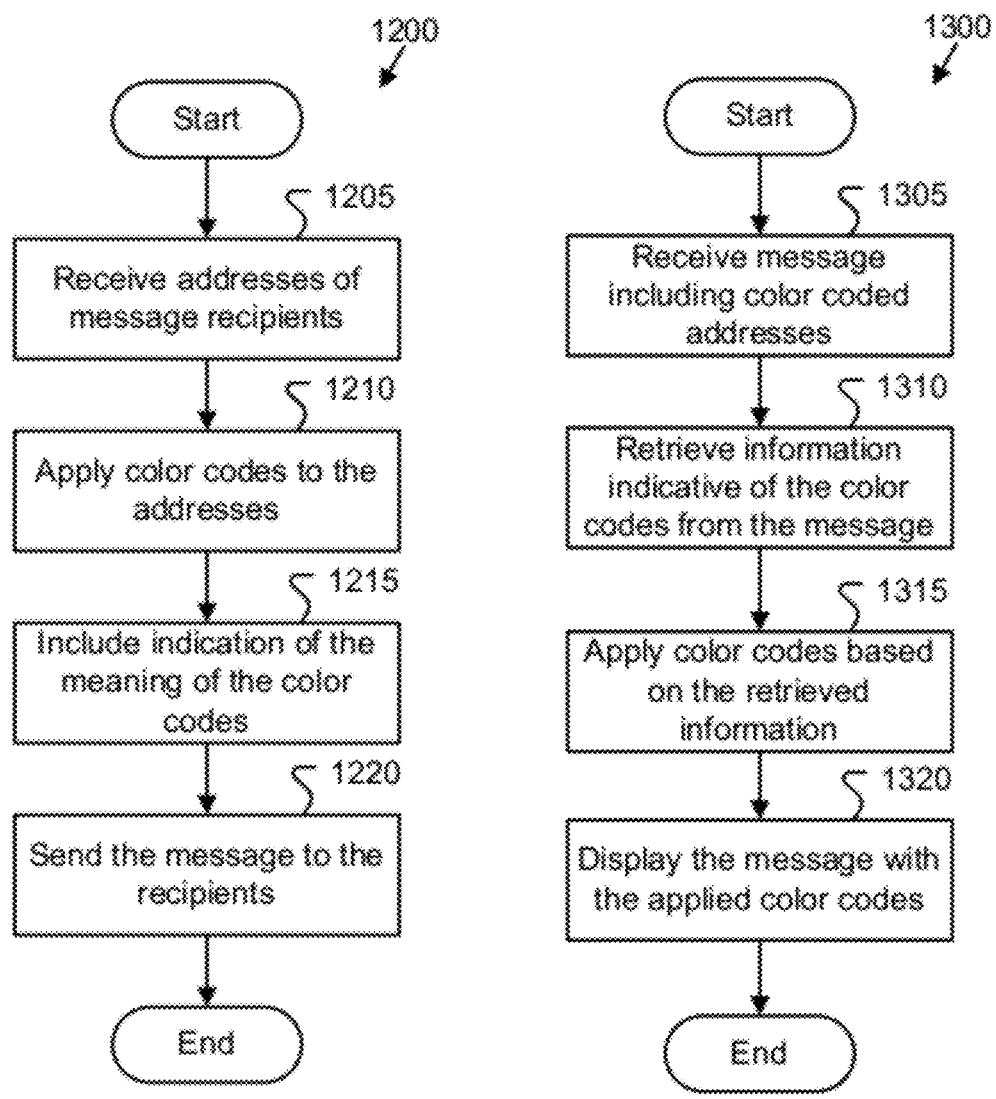
FIG. 12 illustrates an exemplary process flow for color-coding e-mail addresses for a message.
FIG. 13 illustrates an exemplary process flow for receiving and displayed a message having color coded addresses.

FIG. 12 illustrates an exemplary process flow 1200 for color-coding e-mail addresses 110 for a message 105. The process 1200 may be performed by various systems, such as the system 100 described above with respect to FIG. 1. For example, the process 1200 may be performed at least in part by the e-mail client 135-A as part of sending a message 105.

In block 1205, the system 100 receives addresses 110 of recipients of the message 105. For example, an e-mail client 135 may provide a user interface 140 including one or more address fields, and a sender may specify recipients to receive the message 105 through use of the address fields. In some instances, the sender may manually type in the addresses 110 of one or more recipients to receive the message 105. In other instances, the sender may select addresses 110 or distribution lists 115 from an address book.

In block 1210, the system 100 applies color codes 120 to the addresses 110 of the message 105. For example, the e-mail client 135 may provide a user interface 140 through which a sender may select color codes 120 for the addresses 110 in the address fields. As another example, in instances where a distribution list 115 is included in an address field, the e-mail client 135 may utilize color codes 120 defined in the distribution list 115 for the addresses 110 of the message 105 recipients. In some instances, the addresses 110 of the distribution list 115 may be associated with color codes 120, while in other instances the addresses 110 of the distribution list 115 may be associated with attributes 125, where the attributes 125 are associated with color codes 120. In some instances, the attributes 125 or color codes 120 may be updated based on a data source, such as a database, spreadsheet, or other file.

In block 1215, the system 100 includes an indication of the underlying meaning of the color codes 120 in the message 105. To indicate which information in a message 105 is especially relevant to certain recipients, the e-mail client 135 may allow a sender to include an indication 905 within the body of the message 105 specifying the underlying meaning of the color codes 120 in the message 105. For example, the indication 905 may inform a message 105 recipient that those recipients whose addresses 110 appear in red need to pay their dues. In other examples, the e-mail client 135 may generate the indication 905 automatically based on color codes 120 and/or attributes 125 of the addresses 110 and/or distribution lists 115.

In block 1220, the system 100 sends the message 105 to the recipients. For example, the sender may press a send button on a user interface of the e-mail client 135. Upon such a selection, the message 105 may be sent on to the sender's mail server 150 for delivery. After block 1220, process 1200 ends.

FIG. 13 illustrates an exemplary process flow 1300 for receiving and displaying a message 105 having color coded addresses 110. As with the process 1200, the process 1300 may be performed by various systems, such as the system 100 describes above with respect to FIG. 1. For example, the process 1300 may be performed by an e-mail client 135 upon receipt of a message 105 sent according to process 1200.

In block 1305, the system 100 receives a message 105 including color coded addresses 110. For example, an e-mail client 135 may receive a message 105 sent according to process 1200 discussed above with respect to FIG. 12. The message 105 may indicate color coding of the addresses 110 in one or more of a section 1105 of the body 210 of the message 105, and optional-fields of the e-mail header of the message 105.

In block 1310, the system 100 retrieves a representation of the color codes 120 from the message 105. For example, an e-mail client 135 capable of displaying e-mail addresses 110 in color may parse optional-fields of the e-mail header to locate fields indicative of the color codes 120 and/or may parse the body text 210 of the message 105 to locate any sections 1105 indicative of the color codes 120. The e-mail client 135 may further hide any located sections 1105 from view in a user interface 140.

In block 1315, the system 100 applies the color coding to the addresses 110 based on the located information indicative of the color codes 120. For example, the e-mail client 135 may utilize the removed section 1105 to determine what colors to apply to the recipient addresses 110 of the message 105, and may apply those colors to the addresses 110. In other examples, the e-mail client 135 may utilize color-coding information stored in optional-fields of the e-mail header of the received message 105.

In block 1320, the system displays the message to the recipient with the applied color coding. For example, the e-mail client 135 may display the color-coded addresses 110 to the user in the user interface 140. The e-mail client 135 may further display an indication 905 specifying the underlying meaning of the color-coding used for the addresses 110 of the message 105. After block 1320, the process 1300 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
a user device including a processor configured to execute computer-executable instructions of an e-mail client stored on a memory of the user device, the e-mail client being configured to cause the user device to:
receive a plurality of addresses specifying recipients of a message;
apply a color coding to the plurality of addresses, the color coding indicating one or more associated colors in which at least one of the plurality of addresses is to be displayed by a recipient e-mail client; and
send the message including the color coded addresses and indication of meaning of the color coding of the color coded addresses as represented by the color coding such that the recipient email client is able to apply the color coding and display the color coded addresses in the one or more associated colors according to the applied color coding.

2. The system of claim 1, wherein the e-mail client is further configured to cause the user device to include an indication of the underlying meaning expressed by the color coding in the message.

3. The system of claim 1, wherein the e-mail client is further configured to cause the user device to describe the color coding in at least one of a body text of the message and at least one header field of the message.

4. The system of claim 3, wherein the recipient e-mail client is configured to cause a device associated with the recipient e-mail client to:
receive the message including the color coded addresses;
retrieve information indicative of the color coding from the message;
apply the color coding to the addresses; and
display the color coded addresses in the associated colors according to the applied color coding.

5. The system of claim 1, wherein the e-mail client is further configured to cause the user device to receive a selection of a distribution list to specify the plurality of addresses.

6. The system of claim 5, wherein the selected distribution list further specifies a color coding for the specified plurality of addresses.

7. The system of claim 6, wherein the distribution list specifies the color coding by an association of colors with addresses included in the distribution list.

8. The system of claim 6, wherein the distribution list specifies the color coding by an association of attributes with addresses included in the distribution list and an association of colors with the attributes.

9. A method, comprising:
receiving a plurality of addresses specifying recipients of a message;
applying a color coding to at least one of the plurality of addresses by a first device, the color coding indicating one or more associated colors in which at least one of the plurality of addresses is to be displayed by a recipient e-mail client; and
sending the message including the color coded addresses and indication of meaning of the color coding of the color coded addresses as represented by the color coding from the first device such that the recipient email client is able to apply the color coding and display the color coded addresses in the one or more associated colors according to the applied color coding.

10. The method of claim 9, further comprising indicating in the message an underlying meaning expressed by the color coding.

11. The method of claim 10, wherein the indicating of the underlying meaning of the color coding is relating to an action to be performed by recipients specified by the color coded addresses.

12. The method of claim 10, further comprising indicating the underlying meaning by generating indication text according to attributes of the plurality of addresses.

13. The method of claim 10, further comprising:
receiving a selection of a color in which at least one of the plurality of addresses are to be coded;
applying coloring to the at least one of the plurality of addresses in the selected color; and
applying the coloring to an indication of the underlying meaning of the color coding in the selected color.

14. The method of claim 9, further comprising:
receiving the message by a second device; and
displaying addresses by the second device in the associated colors according to the applied color coding.

15. The method of claim 14, further comprising displaying a listing of the color-coded addresses in a body of the message.

16. The method of claim 9, further comprising:
receiving a selection of a distribution list; and
storing the applied color coding in the distribution list.

17. The method of claim 9, further comprising:
pulling data from a data source to use for applying the color coding; and
using the data to update at least one of an attribute and a color code of an address of the message.

18. A non-transitory computer-readable medium tangibly embodying computer-executable instructions configured to cause a processor to:
receive a plurality of addresses specifying recipients of a first message to be sent;
apply a color coding to at least one of the plurality of addresses, the color coding indicating one or more associated colors in which at least one of the plurality of addresses is to be displayed by a recipient e-mail client;
send the first message including the color coded addresses and indication of meaning of the color coding of the color coded addresses as represented by the color coding such that the recipient email client is able to apply the color coding and display the color coded addresses in the one or more associated colors according to the applied color coding;
receive a second message from a sender;
determine a second color coding of addresses of the second message; and
display the addresses of the second message in colors according to the second color coding.

19. The computer-readable medium of claim 18, further including instructions configured to cause the processor to:
locate a textual description of the second color coding in text of the second message;
remove the textual description of the second color coding from the second message; and
determine the second color coding to be displayed according to the textual description of the second color coding.

20. The computer-readable medium of claim 18, further including instructions configured to cause the processor to:
locate optional fields in a header of the second message indicative of the second color coding; and
determine the second color coding to be displayed according to the located optional header fields.

21. The computer-readable medium of claim 18, further including instructions configured to cause the processor to:
determine that an address of the second message is associated with a plurality of color codes; and
display the address of the second message according to the plurality of associated color codes.

* * * * *